(12) United States Patent
Degott et al.

(10) Patent No.: US 7,892,338 B2
(45) Date of Patent: Feb. 22, 2011

(54) METHOD AND INK SETS FOR MARKING AND AUTHENTICATING ARTICLES

(75) Inventors: Pierre Degott, Crissier (CH); Claude-Alain Despland, Lausanne (CH); Edgar Muller, Fribourg (CH)

(73) Assignee: SICPA Holding S.A., Prilly (CH)

( * ) Notice: Subject to any disclaimer, the term of this patent is extended or adjusted under 35 U.S.C. 154(b) by 1558 days.

(21) Appl. No.: 10/528,264

(22) PCT Filed: Sep. 5, 2003

(86) PCT No.: PCT/EP03/09848
§ 371 (c)(1),
(2), (4) Date: Mar. 17, 2005

(87) PCT Pub. No.: WO2004/029163

PCT Pub. Date: Apr. 8, 2004

(65) Prior Publication Data
US 2006/0017957 A1    Jan. 26, 2006

(30) Foreign Application Priority Data
Sep. 24, 2002   (EP)   .................................. 02021179

(51) Int. Cl.
*C09D 11/02* (2006.01)
(52) U.S. Cl. ................. 106/31.32; 106/31.64
(58) Field of Classification Search ............... 106/31.32, 106/31.64
See application file for complete search history.

(56) References Cited
U.S. PATENT DOCUMENTS

| | | | |
|---|---|---|---|
| 5,238,903 A | 8/1993 | Mikoshiba et al. | |
| 5,289,547 A | 2/1994 | Ligas et al. | |
| 5,512,095 A | 4/1996 | Sens et al. | |
| 6,303,213 B1 | 10/2001 | Berneth et al. | |
| 6,786,954 B1 * | 9/2004 | Lee et al. ................. | 106/31.13 |
| 7,138,009 B2 * | 11/2006 | Auslander ................ | 106/31.32 |
| 7,192,474 B2 * | 3/2007 | Auslander et al. ........ | 106/31.32 |

FOREIGN PATENT DOCUMENTS

| | | |
|---|---|---|
| DE | 10154051 | 6/2002 |
| JP | 10-149473 | 6/1998 |
| JP | 2000-318291 | 11/2000 |
| JP | 2001-019887 | 1/2001 |
| JP | 2001-207091 | 7/2001 |
| JP | 2005-537319 | 12/2005 |
| WO | 97/35926 | 10/1997 |
| WO | WO00/77104 | 12/2000 |
| WO | 02/16497 | 2/2002 |

* cited by examiner

*Primary Examiner*—Jerry Lorengo
*Assistant Examiner*—Veronica Faison Gee
(74) *Attorney, Agent, or Firm*—Shoemaker and Mattare

(57) ABSTRACT

The invention discloses a method for marking and authenticating a security article, such as a banknote, a document, a ticket, a foil, a thread, a label, a card, or a commercial good, so as to provide for an easy authentication of said article by a machine, such as a currency acceptor, a ticket validator, or a hand-held authentication device. According to the disclosed method, the security article carries a marking in the form of a user-defined design, wherein said marking comprises dyes or pigments belonging to an extended, or hyperchromic color space which is not reproducible by commercially available, 4-color desktop reproduction equipment. The authentication of said marking includes the mathematical transformation of the crude spectral information to statistically independent hyper-color coordinates, and the comparison of selected hyper-color coordinates with corresponding reference values.

23 Claims, 6 Drawing Sheets

METHOD AND INK SETS FOR MARKING AND AUTHENTICATING ARTICLES

The invention is about security documents and articles, i.e. bank notes, value papers, identity documents, cards, tickets, labels, security foils, security threads and the like, which can be easily authenticated by stationary or portable electronic equipment, such as currency acceptors, processing machines, ticket validators, hand-held authentication devices, etc., and of methods to produce and authenticate such security documents or articles through the application of dyes or pigments exhibiting a specific spectral absorption.

The increasing availability to the general public of desktop color printing and reproduction equipment, such as color computer printers, color scanners and color copiers, has raised an additional threat to document security. In particular, the currently used security features do not provide sufficient protection against counterfeits at automatic banknote acceptors, where exclusively electronic means are used for the authentication.

Known security features suitable for authentication with electronic means are described for example, in EP-B-0 053 124 and EP-B-0 053 183, EP-B-0 053 125, EP-B-0 024 053, EP-B-0 340 898, or EP-B-0 537 431. These features are based on luminescence, magnetic properties, or on absorption in the non-visible range of the electromagnetic spectrum. However, the exploitation of several of said physical effects is accompanied with drawbacks. For example, in the case of luminescence, the to-be-measured light intensities are generally low, requiring sophisticated technology, including the shielding of ambient light and of other potentially perturbing effects. Magnetic properties are less suited as a security feature, because they require in general a mechanical contact between the bank note and the magnetic sensor device (reading head). This constitutes a major source of errors, caused by jamming of 'in-bad-shape' bank notes in the reader device.

A shortcoming of the 'classic' UV or IR-absorber based banknote security features, such as disclosed in EP-A-0 024 053, is noteworthy that they rely on the use of a single absorber compound as a covert security element outside the visible range of the spectrum. The presence of the covert security element can be revealed with the help of commonly accessible, cheap CCD cameras (e.g. door-watcher cameras, having a sensitivity range of 300 to 1,100 nm wavelength) and commonly accessible generic UV and IR filters, available in photo-shops. Generic UV- and IR-absorbing compounds are furthermore used in many areas of current technology, noteworthy in certain electrophotography toners, and are thus commercially available as well.

It was therefore the object of the present invention to provide a protection for a security article against counterfeiting, which overcomes the above described drawbacks of the prior art and which allows an easy authentication of said article by machines, such as currency acceptors, ticket validators, etc.

The stated problem is solved in particular by a printing ink and/or a set of printing inks and the use thereof for marking and/or authenticating an article, as defined in the independent claims.

The present invention relies on the selection of dyes or pigments which cannot be perceived correctly by the human eye, in particular on a selection of a set of such dyes or pigments constituting a color space which cannot be perceived in its entirety by the human eye.

The human eye's color perception is based on the signals of only three different types of receptors, one for long wave (600 nm; red), one for intermediate wave (550 nm; green), and one for short wave (450 nm; blue) light. In addition to these, a general white light receptor, having a sensitivity maximum at about 550 nm, is present, too. The relative sensitivity curves of the three photoreceptors, which correspond to the spectral absorption curves of the related photopigments in the eye, have been experimentally determined and are known as the "Color Matching Functions", as defined by the Commission Internationale d'Eclairage (C.I.E.). They are the basis of all human color reproduction technology. Every visible color can noteworthy be expressed within this CIEXYZ-system by three basic color coordinates: X (red), Y (green) and Z (blue); confining the human color vision to a three-dimensional color space. The human eye noteworthy lacks light perception in the ultraviolet (UV, below 400 nm wavelength), and in the infrared (IR, above 700 nm wavelength) range of the electromagnetic spectrum.

Huge efforts and work have been dedicated in the past to the development and the selection of dyes, pigments and other devices, in order to reproduce colors as "truly" as possible, as set forth by the properties of the human eye. Today's color reproduction technology relies in fact on a narrow selection of particularly adapted printing pigments, of carefully selected cathode ray tube phosphors and of sophisticated optical filters for color cameras and scanning elements.

Color in security applications, however, has a totally different purpose. Objects need not have to be depicted in "true" color, but quite often, color has a mere functional sense, e.g. to distinguish between the different denominations within a currency series.

To counteract the modern threat of generally available and ever more sophisticated color reproduction equipment to currency, value documents and other articles whose reproduction is undesirable, the present invention discloses a novel method of marking and/or authentication, based on the use of selected dyes or pigments. The present invention is based on a deliberate departure from the base colors of the three-dimensional CIEXYZ color space. The marking on a value document or article according to the present invention comprises i) visible colors which are not used in ordinary color reproduction or printing, ii) narrow-band absorbers which do only yield pastel shade color, and iii) invisible 'colors' which correspond to absorption outside the visible range (400 to 700 nm) of the electromagnetic spectrum, either in the ultraviolet (below 400 nm) or in the infrared region (above 700 nm).

Thus, the present invention is related to a printing ink, comprising at least one dye or pigment having at least one absorption maximum in the visible range of the electromagnetic spectrum which is substantially different from the absorption maxima of the base colors of the CIEXYZ system, or which is outside the visible range of the spectrum, and/or having an absorption band in the visible range of the electromagnetic spectrum whose band width at half intensity is narrower than 2400 $cm^{-1}$, preferably narrower than 2000 $cm^{-1}$, and most preferably narrower than 1500 $cm^{-1}$.

Furthermore, the present invention is related to set of printing inks, comprising at least two printing inks as defined above.

In particular, the present invention discloses the use of a 'hyperchromic color system', embodied by a corresponding set of dyes or pigments and/or a corresponding ink set, and comprising at least 3, preferably at least 4 base colors which are chosen such as to have at least one absorption maximum which is substantially different from the absorption maxima of the base colors of the CIEXYZ-system (which comprises the additive base colors red, green, blue; or the subtractive base colors yellow, magenta and cyan, respectively). The color system according to the present invention may hereby comprise selective UV, visible and IR absorbing components, embodied by corresponding dyes or pigments. It may also comprise selective UV, visible and IR reflecting components, embodied by corresponding pigments. Preferably, the visible dyes or pigments are chosen to have spectral transmission or reflection maxima which are different from the 'CIEXYZ-maxima' located at 450 nm (blue), 550 nm (green) and 600 nm (red). Preferably, the color system according to the invention comprises at least one dye or pigment absorbing in the UV or in the IR region of the electromagnetic spectrum; more preferably, the color system comprises at least two dyes or pigments absorbing in the IR region of the electromagnetic spectrum.

Of particular interest in the context of the present invention are narrow-band absorbing dyes or pigments, as they allow for the introduction of more spectral variety inside a given, available spectral range (such as the 300 nm to 1100 nm range). Within the visible spectral range, preferred dyes or pigments have substantially narrower absorption bands than those of the eye's CIEXYZ Color Matching Functions. It is then possible to cover even the visible spectral domain with more than three of said dyes or pigments, hereby creating a hyperchromic visible color space.

The eye's color matching functions have noteworthy the following properties:

|  | maximum of sensitivity | bandwidth at half intensity |
|---|---|---|
| blue absorber: | 445 nm (22'500 cm$^{-1}$) | 55 nm (2'800 cm$^{-1}$) |
| green absorber: | 555 nm (18'000 cm$^{-1}$) | 110 nm (3'600 cm$^{-1}$) |
| red absorber: | 595 nm (16'800 cm$^{-1}$) | 85 nm (2'400 cm$^{-1}$) |

The first of the indicated numbers refers to the wavelength (in nm); the second number to the energy (in cm$^{-1}$), respectively.

Conversion to 1000 cm$^{-1}$: 10,000/wl

Bandwidth in 1000 cm$^{-1}$: 10,000*bw/wl$^2$ (wl=wavelength in nm; bw=bandwidth in nm)

Substantially narrower absorption bands than the said color matching functions shall mean, in the context of the present invention, an absorption band having a band width at half intensity which is narrower than 2,400 cm$^{-1}$. In particular, the dye or pigment according to the present invention has preferably a band width which is lower than 2,000 cm$^{-1}$, more preferably a band width lower than 1,500 cm$^{-1}$. The band width of said dye or pigment should, however, be larger than 100 cm$^{-1}$, excluding rare-earth based extremely-narrow-band absorbers.

Narrow-band absorbing dyes or pigments are also of interest in the ultraviolet (300-400 nm) and in the infrared, in particular in the 700 nm to 1,100 nm wavelength range, which are detectable by the commercially available silicon photo-detector devices, such as photodiodes, CMOS- and CCD-cameras. Using a couple of narrow band absorbing compounds in the said IR wavelength range allows noteworthy to implement graphic 'multicolor' security designs, comprising one or more invisible 'infrared colors'. In a particular embodiment, three IR-pigments, absorbing in the 700 to 800 nm, the 800 to 900 nm, and the 900 to 1,000 nm range, respectively, may be used to print a trichromic picture in the infrared region of the electromagnetic spectrum, which is invisible to the unaided human eye. The picture can be camouflaged by overprinting it with one or more IR-transparent visible colors. The resulting trichromic IR-picture may then be visualized or inspected with the help of a corresponding electronic 'IR-color' camera and a visual color display.

The dyes or pigments to be used according to the present invention may in general be selected among the organic molecular compounds, the organic polymeric compounds or the inorganic compounds. As a general principle in the context of the present invention, a 'color' of the hyperchromic color system is embodied by a corresponding, single chemical compound, which may have one or several absorption bands in the 300 to 1,100 nm spectral region. A hyperchromic color system comprising at least 3, preferably at least 4 base colors is thus embodied by an ink or a set of inks comprising at least 3, preferably at least 4 different chromophoric compounds, i.e. such which have absorption spectra which are substantially different from each other in the 300 to 1,100 nm wavelength range. Substantially different means according to the present invention that the statistical correlation of two spectra represented by two vectors s1 and s2, as expressed by the normalized scalar product (s1*s2)/(|s1|*|s2|), shall not exceed 0.95. The vectors s1 and s2 are explained below.

The dyes or pigments according to the present invention need thus not to be all very different in color; the hyperchromic color system could, e.g., comprise two different yellow, two different blue, and two different red dyes or pigments in varying proportions. A photocopying machine would have to reproduce these colors using a single yellow, a single blue and a single red dye. A corresponding detection device would rely, in contrary, on two different yellow, two different blue, and two different red channels, and thus be able to differentiate easily between the original and the copy.

Dyes and pigments which are useful for implementing the method and for making a printing ink or coating composition according to the present invention can be found in several substance classes. In a preferred embodiment they are selected from the group comprising cyanines (polymethines) and the related cyanin-type chromophores; quinones and the related quinone-type chromophores; porphines, phthalocyanines and the related macrocyclic chromophores; as well as heterosubstituted polycyclic hydrocarbon chromophores. A chromophore, in the context of the present invention, is a "color-generating" chemical group, exhibiting absorption somewhere in the 300 nm to 2,500 nm, wavelength range. The chromophore may have a molecular or a polymeric structure; it may furthermore carry chemical substituents of all kind, and/or be linked into or grafted onto a polymer chain.

Cyanine (polymethine) dyes are known in the art and used as photographic sensitizers (D. M. Sturmer, *The Chemistry of Heterocyclic Compounds*, Vol 30, John Wiley, New York, 1977, pp 441-587; Eastman Kodak). In a more recent application, stable representatives of this compound class, selected from the coumarins and rhodamines, were also used as laser dyes (J. B. Marling, J. H. Hawley, E. M. Liston, W. B. Grant, *Applied Optics*, 13(10), 2317 (1974)).

Porphines and related molecules can be viewed as macrocyclic cyanine structures, conformationally rigidized by their cyclic nature, in particular in the presence of a coordinated metal ion, such as $Mg^{2+}$ and other. As a consequence, their long-wave absorption band is very sharp and they are almost ideal examples of a narrow-band absorbing dye according to the invention. Chlorophyll-a (absorption band at 660 nm; extinction coefficient ε of 85,000) is a dye of this class (K. Sauer et al., J. Am. Chem. Soc. 88, (1966), 2681-88). As porphines and related molecules are rather difficult to synthesize, their industrial use is restricted to the naturally available compounds.

Phthalocyanines and related molecules are the "industrial variant" of porphines. They generally absorb at the long wavelength end of the visible spectrum, and the largeness of their absorption band depends heavily upon their crystal packing (aggregation). Narrow-band absorption is generally observed in diluted solution of such dyes, and for certain pigments in the solid state, in particular if a stacking of the pigment's chromophoric groups is absent. The class of phthalocyanines at large comprises as well the higher-conjugated analogs, such as the naphthalocyanines, which absorb farther in the IR, as well as the heterosubstituted analogs of phthalocyanines; the common point defining this compound class is that all of its members are derived from aromatic ortho-dicarboxylic acids or from their derivatives.

Quinone dyes are known in the art and used for textile and related dying applications (e.g. indigoid dyes, anthraquinone dyes, etc.). Electronegative groups or atoms along the quinone skeleton can be present to enhance the intensity of the absorption band, or to shift it to longer wavelengths. Some dyes of this class, especially those which carry no NH or OH groups, show narrow absorption bands. Examples of such dyes are thioindigos, N,N'-dialkylindigos, N,N'-alkylene-indigos, etc.

Heterosubstituted polycyclic hydrocarbon dyes are rigid, planar molecular structures, at the image of the graphite lattice, carrying appropriate substituents. Peryleneimides, quinacridones, dioxazines, etc. are examples of such dyes.

An important aspect in prospecting for narrow-band absorbing pigments is to avoid aggregation between the individual dyestuff molecules; a tendency which is inherent to most organic polycyclic compounds and even more enhanced in the case of a molecule's capability to undergo hydrogen bonding. Aggregation in most cases broadens the spectral absorption bands; it is thus to be considered an undesired feature in the context of the present invention. There are different ways to solve this problem:

- Use of dye molecules which do not form said absorption-band-enlarging aggregates.
- Use of dye molecules which are soluble in an inert polymeric carrier compound; the correspondingly obtained mass-stained and comminuted polymer may be used as a printing pigment.
- Use of dye molecules which are co-polymerizable into an established polymer matrix, e.g. polystyrene, or which are graft-able onto an existing polymer; the correspondingly obtained mass-stained and comminuted polymer may be used as a printing pigment or as a varnish additive.

A large number of suitable pigments and dyes for embodying the invention have already been described in the literature. However, ordinary, commercially available colorants are purposely designed to fit the human eye's broad-line color matching functions. Most of the known narrow line absorbing molecules or compositions are, for this reason, not industrially exploited as pigments or dyes, due either to their "lack of color strength" as perceived by the human eye, or to their light dependent color change ("untrue colors"). The same holds as well for the commercial infrared absorbing dyes or pigments, which were designed for use in optical recording materials, where a rather broad absorption band is required.

The absence of a commercial market for most of the dyes or pigments which are useful in the context of the present invention increases the security potential of the disclosed method and of its embodiments. The application of non-commercial dyes and pigments in the field of security printing requires their dedicated production and enables in consequence an effective control of the source of the material; a very crucial requirement to warrant security.

Preferred dyes according to the present invention are shown in FIG. 2. FIG. 2a is a Hexadeca-(3-ethoxy-1-thiophenolato)-phthalocyanato-zinc(II) absorbing in the region of 780 nm. FIG. 2b is a Deca-(3-ethoxy-1-thiophenolato)-hexa-(3-methyl-1-thiophenolato)-phthalocyanato-zinc(II) absorbing in the region of 850 nm. The formula of FIG. 2b is for an industrial product and represents a statistical mean over a certain distribution of the substituents.

In the herein presented authentication technology, the measured spectral reflection intensity values of the document to be authenticated are not directly used as such, but rather tied to the pigment and/or dye composition on the document, in order to confer the system a higher degree of robustness in practical application.

In the following it is assumed that the document is authenticated by an assessment of its light reflection properties. The method and devices can however be applied with the necessary changes as well to the authentication of a document by an assessment of its light transmission properties, such as practiced in certain types of automatic vending machines. In the reflection case, and using conventional subtractive color-mixing pigments, the observed reflection color is due to the pigment's spectral absorption, because the incident light is passing a first time through the pigment, scattered back at the white background, and passing a second time trough the pigment. The net effect is just a doubling of the apparent color strength, compared to the corresponding transmission case.

For the evaluation, optical densities $OD=\log(I_0/I_{reflected})$ or $\log(I_0/I_{transmitted})$ are used, rather than the reflected or transmitted intensity values themselves. For a given wavelength $\lambda$, the optical density is proportional to the pigment concentration c, to the layer thickness d, and to the pigment's specific absorption $\epsilon(\lambda)$:

$$OD(\lambda)=c*d*\epsilon(\lambda) \hspace{2cm} \text{(Beer's law)}$$

In a hyperchromic color system, the choice of the base colors is free, under the condition that said base colors have substantially different absorption or reflection spectra, such as defined above. The correlation between a measured absorption or reflection spectrum $S(\lambda)$ and the corresponding 'hyper-color coordinates' x1, x2, x3, x4, . . . in the chosen hyperchromic color system, which indicate the concentrations or 'optical densities' of the individual chromophoric compounds, can be established with the help of linear algebra. Deriving 'hyper-color coordinates' allows noteworthy to assign a statistically independent value to each dye or pigment of the hyperchromic color system, if the dyes or pigments of the set have partially overlapping absorption spectra. The method shall be outlined in the following, using commonly known formalism of matrix algebra.

According to the method, an standard absorption spectrum $S(\lambda)$ of a dye or pigment is expressed by a vector $s=(s_1, s_2, s_3, \ldots s_n)$, wherein $s_1, s_2, s_3, \ldots s_n$ are the measured spectral absorbance values (optical densities $OD=\log(I_0/I_{reflected})$, as defined in the art) at n different wavelengths $\lambda_1, \lambda_2, \lambda_3, \ldots \lambda_n$. Said wavelengths can hereby be chosen freely, but they should be related to the dyes or pigments used, and noteworthy allow a discrimination of the different constituents of the hyperchromic color system.

The hyperchromic system shall further comprise m different colorants, whereby m is smaller, typically half or less, than n, the number of measured intensity values for different illumination 'wavelengths'. There are thus m of the said vectors s, representing the dyes' or pigments' absorption or reflection spectra. Said m vectors s are arranged in a rectangular matrix A, comprising m columns of n elements each. Any linear combination of colorants within the chosen hyperchromic color system will result in an absorption or reflection spectrum $y=(y_1, y_2, y_3, \ldots y_n)$, which can be expressed through the matrix equation:

$$A*x=y$$

wherein A is the said matrix of dimensions (n x m); x is the vector of the m linear factors, corresponding to the hyper-color coordinates, and y is the vector of the resulting n spectral absorption or reflection values.

On the other hand, knowing the matrix A, a measured absorption or reflection spectrum y1 can be expressed in terms of hyper-color coordinates x, using the classic 'least-squares' formula of linear algebra:

$$x=(A'*A)^{-1}*A'*y1$$

wherein A' denotes the transposed of matrix A, and $(A'*A)^{-1}$ denotes an inverse matrix. The goodness of fit of the approximation can be assessed by statistical criteria, such as the sum of deviations squared $(y-y1)'*(y-y1)$, or others known in the art. Such criteria may serve as a further authentication tool.

The goodness of fit is preferably assessed by the residual, or R-number, which is defined as: $R=\{(y1-y)'*(y1-y)\}/\{(y1)'*(y1)\}$; wherein $y=A*x$ is the back-calculated theoretical spectrum corresponding to the determined hypercolor-coordinates x, and y1 is the measured spectrum of the specimen under test. The R-value is zero for a perfect concordance (y=y1), and 1 for the absence of concordance (y=0). It is furthermore relatively insensitive to random fluctuations (statistical noise) affecting the measured spectrum y1, but very sensitive to systematic deviations, i.e. the presence of a wrong, or of an additional, unexpected colorant or pigment in the coating composition.

Other, similar algorithms of linear algebra may be used as well to the same purpose, noteworthy the algorithm of Singular-Value-Decomposition (SVD), which is related to the problem of equation-solving and the method of 'least-squares'.

The above stated means that there exists a (m x n) matrix M, which relates the measured spectrum y to the 'hyper-color coordinates' x of the corresponding color-space through a simple mathematical transformation:

$$x=M*y$$

Said matrix $M=(A'*A)^{-1}*A'$ can be calculated from the absorption spectra of the base colors of the hyperchromic color system.

Said dyes or pigments of the hyperchromic color system, incorporated into a printing ink or coating composition, or into a set of printing inks or coating compositions, are used according to the present invention in a method for marking an article, such as a banknote, a document, a ticket, a foil, a thread, a label, a card, or a commercial good, comprising the step of providing on said article a marking, e.g. in the form of indicia or a user-defined design, which is applied by using at least one printing ink or coating composition, or a set of printing inks or coating compositions as defined above.

Furthermore, said dyes or pigments, implemented in a printing ink or coating composition, or in a set of printing inks or coating compositions, and applied to an article, are used according to the present invention in a method for authenticating said article, such as a banknote, a document, a ticket, a foil, a thread, a label, a card, or a commercial good, comprising the steps of:

a) measuring an optical absorbance, reflectance or transmittance spectrum of said article marked by the method described above, in the UV, and/or visible and/or IR wavelength domain of the electromagnetic spectrum;

b) comparing the spectrum and/or information derived therefrom with a corresponding spectrum of an authentic item and/or information derived therefrom.

The marking and the authenticating part of the method may be performed together or separate from each other, by a same or a different operator, at the same or at a different location, using either a same or a different device.

Inks and coating compositions useful to impart the marking may be chosen from the group of pasty inks, such as intaglio, letterpress and offset inks; from the group of liquid inks, such as screen-printing, helio-flexo, and gravure inks; or from the group of drop-on-demand and of continuous ink-jet inks. Useful coating compostions to impart the marking comprise furthermore toners for electrostatic (dry) or electrophoretic (wet) photo-printing processes.

The application of said user-defined marking design is performed with the help of inks or ink sets comprising an ink for each of the selected base-colors of the extended, hyperchromic color space. An individual ink may also comprise more than one dyes or pigments embodying said base-colors.

The spectra of the printed design may be measured as known in the art, using either: a combination of a broad-band emitting light source and a plurality of narrow-band sensitive photodetectors; a combination of a broad-band sensitive photodetector and a plurality of narrow-band emitting light sources; or a combination of a broad-band emitting light source and a dispersive or diffractive spectrometer device. A combination of a plurality of narrow-band emitting light sources, such as LEDs, and a broad-band sensitive imaging device, such as a CCD- or CMOS-camera, may furthermore be used to perform a spectral or hyperspectral imaging of the printed design.

The step of deriving and comparing hyper-color coordinates, rather than crude spectral absorbance, reflectance or transmittance values, brings in the advantage of robustness. A hyperchromic color space can noteworthy be chosen to contain first pigments for decorative purposes, together with second pigments for security purposes, wherein the decorative and the security pigments have partially overlapping absorption spectra. It would be difficult, in such a case, to identify the presence and the amount of a security pigment in a marking without transforming the spectral information to the statistically independent quantities of the hyper-color coordinates.

The method of document protection according to the present invention and the resulting security documents or articles are highly suited for the authentication by machines, such as used in automatic currency acceptors, teller machines, high-speed sorting machines, ticket validators and the like. Authentication by machines is noteworthy limited to the checking of such security features whose detection is intrinsically rapid and which do not require a close contact between the document and the reading device, due to the danger of obstruction (jamming). Optical methods are therefore among the preferred ones for machine-authentication. Due to the use of selective absorption rather than emission, the available light, as reflected from the document, is more than sufficient, allowing for a very rapid measurement cycle, and thus for a high-speed operation of the authentication device.

The invention will now be further explained with the help of the Figures as well as examples. These figures and examples are not intended to limit the scope of the present invention.

Figure 1:
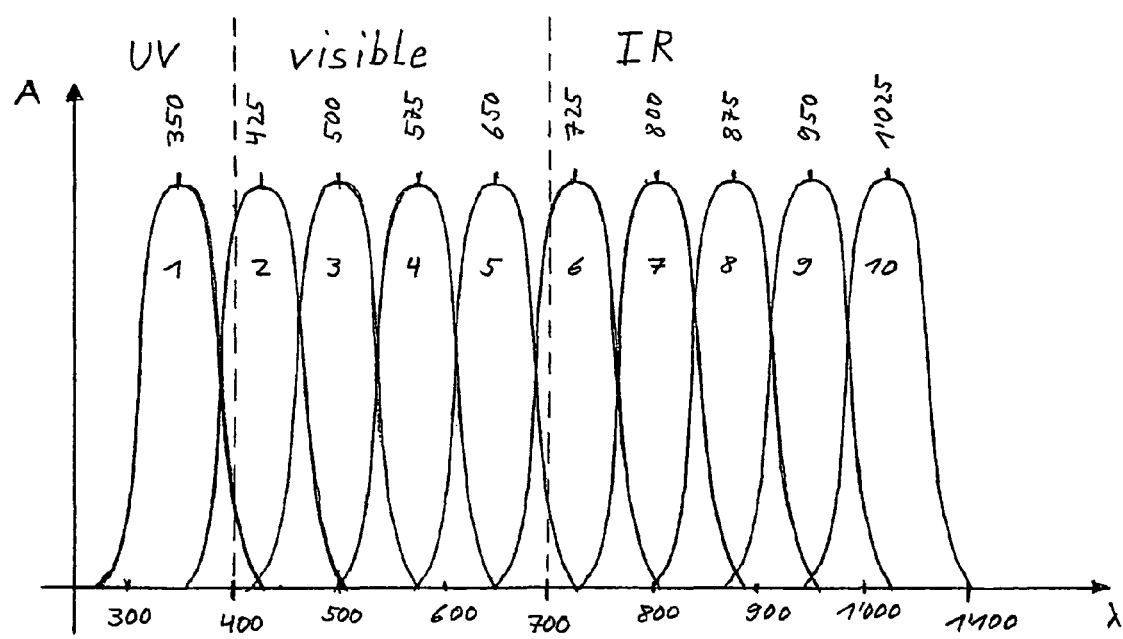
FIG. 1 shows a schematic embodiment of an extended color space according to the present invention, illustrating the use of narrow-band absorbing pigments or dyes inside and outside the visible range of the spectrum.
Figure 2A:
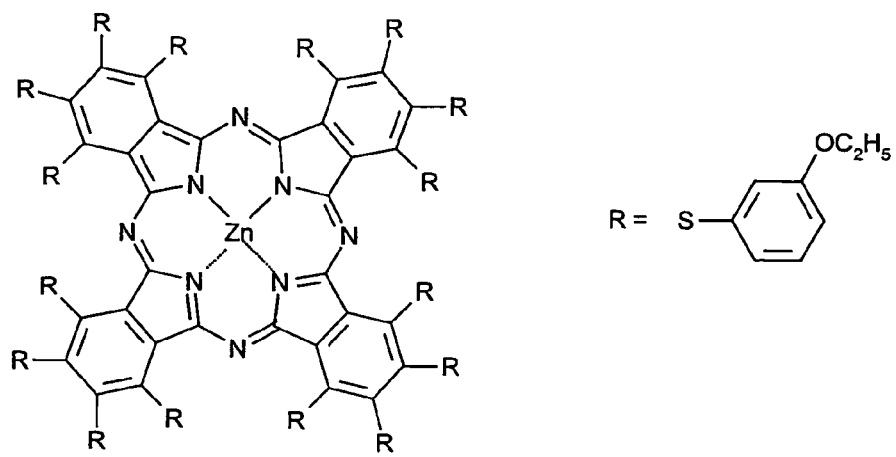
FIG. 2 shows the formulas of two IR-absorbing compounds which are useful in the context of the present invention.
Figure 2B:
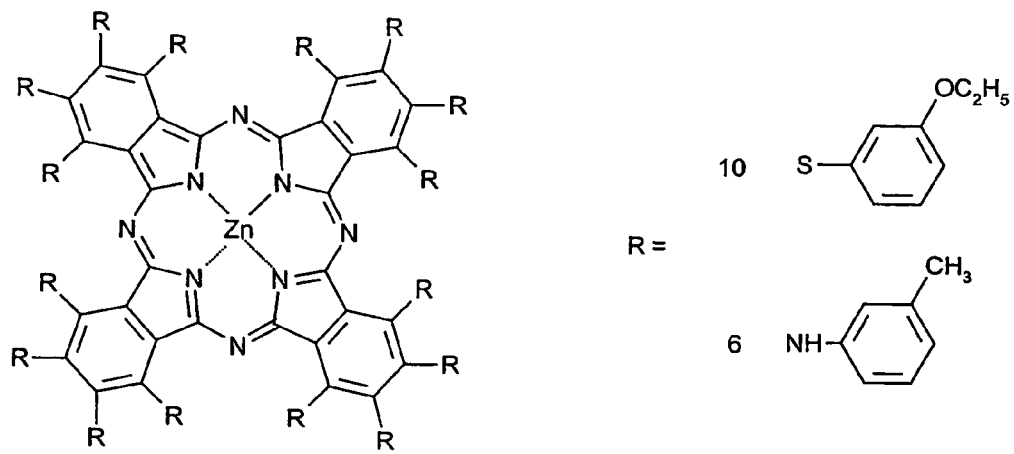

In a first, schematic example as shown in FIG. 1, an extended hyperchromic color space is constituted by ten narrow-band absorbing dyes or pigments labeled 1 to 10. They have absorption maxima within the spectral range of 300 to 1,100 nm wavelength. Dye 1 has an absorption maximum in the UV (350 nm). Dyes 2, 3, 4, 5 have absorption maxima in the visible (425, 500, 575, 650 nm), and dyes 6, 7, 8, 9, 10 have absorption maxima in the IR (725, 800, 875, 950 and 1,025 nm wavelength). In particular, the visible range is covered by four dyes, instead of three corresponding to the human eye's receptors. Visible dyes 3 and 4 are noteworthy selected as to have an absorption maximum of 500 nm, falling in between the blue (450 nm) and the green (550 nm), respectively of 575 nm, falling in between the green (550 nm) and the red (600 nm) photoreceptor of the human eye. Colors such as these, if combined with a pure blue (425 nm) and a pure red (650 nm) dye, will result impossible to reproduce by the standard trichromy process colors, because four constraints cannot be accommodated by three variables.

An article is now marked using an ink or an ink set comprising one or more of said narrow-band absorbing dyes or pigments. The color information comprised on said article is hereby effectively chosen out of a ten-dimensional manifold, although humans only can see and describe it in terms of a three-dimensional color perception. The human eye's impression of the security article's color corresponds thus to a projection of said article's real color information onto a three-dimensional color perceiving system. This projection is performed under the light of the illuminating source used to view the document. Changing the light quality of said illuminating source may lead to a different projection, and therefore to a different color perception. The use of visible narrow-band absorbing dyes or pigments in coatings invariably results in an illumination-dependent variation of the shades ("untrue" colors).

When said article, e.g. a banknote or a document, is reproduced by a color copier, or scanned by a color scanner, its spectral information in the visible domain is channeled by corresponding optical filters into the three base colors red, green and blue.

A projection of the extended color information contained on said document onto these three color channels is performed under the particular light of the copier or scanner. When the scanned color information is subsequently reproduced by printing, standard dyes or pigments, corresponding to the human eye's three-dimensional color perception, are deposited on the paper, in place of the original, narrow band absorbing colorants. The resulting reproduction will look about the same, if seen under the same light which was used to scan the original. However, it may look quite different if seen under a different light than that used to scan the original.

In particular, the optical features outside the visible range, i.e. the ones located in the UV (UV-dye 1) and the ones located in the IR (IR-dyes 6 to 10), are not reproduced by common reproduction equipment, and are thus lacking on the copy. The visible features, due to dyes 2 to 5, will be reproduced, but not correctly. The resulting "color difference" between the original and its counterfeit can be evidenced to the human eye by comparing both under at least two different visible light sources, and, in the complete UV to IR range of the spectrum, by photodetectors or spectroscopic means.

In the following, the preparation and use of ink sets according to the present invention is illustrated at the examples of three different types of ink formulations:

Formulation 1:

Intaglio Printing Ink Set Formulation with 5 Inks

| | |
|---|---|
| Addition product of tung oil and maleic acid modified phenolic resin in a high boiling mineral oil (PKWF 28/31) | 35% |
| Long oil alkyd resin | 7.5% |
| Alkylphenolic resin modified with raw tung oil in ink solvent 27/29 (Shell Industrial Chemicals) | 16% |
| Polyethylene wax | 1.5% |
| Calcium carbonate | 30.3% |
| Dyes and Pigments | 4.5% |
| Ink solvent 27/29 (Shell Industrial Chemicals) | 5% |
| Cobalt octoate (11% metal) | 0.1% |
| Manganese octoate (10% metal) | 0.1% |

Dyes and Pigments:

Ink 1: Absorption Peak at 470 nm

| | |
|---|---|
| Acridine Orange Base (Aldrich) | 1.0% |
| Calcium carbonate | 3.5% |

Ink 2: Absorption Peak at 850 nm

| | |
|---|---|
| Deca-(3-ethoxy-1-thiophenolato)-hexa-(3-methyl-1-thiophenolato)-phthalocyanato-zinc(II) (Avecia) | 4.0% |
| Calcium carbonate | 0.5% |

Ink 3: Absorption Peak at 380 nm

| | |
|---|---|
| Tinuvin 1130 (Ciba) | 4.5% |
| Calcium carbonate | — |

Ink 4: Absorption Peak at 980 nm

| | |
|---|---|
| Long-wave NIR aborber (Avecia) | 3.0% |
| Calcium carbonate | 1.5% |

Ink 5: Absorption Peaks at 620 and 780 nm

| | |
|---|---|
| X-form copper phthalocyanine pigment | 1.8% |
| Calcium carbonate | 2.7% |

The ingredients were mixed together and the mixture was homogenized by 2 passes on a triple-roll mill.

Formulation 2:

Dry Offset UV-Drying Ink Set Formulation with 3 Inks

| | |
|---|---|
| Epoxyacrylate oligomer | 39% |
| Trimethylolpropanetriacrylate monomer | 31% |
| Genorad 16 (Rahn) | 1% |
| Talc | 2% |
| Dyes and pigments | 4.5% |
| Calcium carbonate | 10.5% |
| Aerosil 200 (Degussa-Huels) | 4% |
| Irgacure 500 (CIBA) | 6% |
| Genocure EPD (Rahn) | 2% |

Dyes and Pigments:

Ink 1: Absorption Peak at 550 nm

| | |
|---|---|
| Rhodamine B (Aldrich) | 1.5% |
| Calcium carbonate | 3.0% |

Ink 2: Absorption Peak at 780 nm

| | |
|---|---|
| Octabutoxy copper(II) naphthalocyanine | 4.5% |
| Calcium carbonate | — |

Ink 3: Absorption Peak at 890 nm

| | |
|---|---|
| Hexadeca-(3-ethoxy-1-thiophenolato)-phthalocyanato-zinc(II) (Avecia) | 2.7% |
| Calcium carbonate | 1.8% |

The ingredients were mixed together and the mixture was homogenized by 2 passes on a triple-roll mill.

Formulation 3:

Gravure Ink Set Formulation with 4 Inks

| | |
|---|---|
| Ethanol | 32% |
| Ethyl acetate | 45.3% |
| Dicyclohexylphtalate (Unimoll 66, supplied by Bayer) | 4.5% |
| Fumaric acid modified rosin (Rokramar 7200, supplied by Robert Kraemer GmbH&Co) | 3% |
| Polyvinylbutyral resin (Pioloform BN18, supplied by Wacker-Chemie) | 12% |
| Dyes and pigments | 3.2% |

Dyes and Pigments:

Ink 1: Absorption Peak at 550 nm

| | |
|---|---|
| Rhodamine B base (Aldrich) | 0.4% |
| Ethyl acetate | 2.8% |

Ink 2: Absorption Peaks at 610 and 680 nm

| | |
|---|---|
| Luxol fast blue MSN (Aldrich) | 3.2% |
| Ethyl acetate | — |

Ink 3: Absorption Peak at 440 nm

| | |
|---|---|
| Macroflex Yellow 6G (Bayer) | 1.0% |
| Ethyl acetate | 2.2% |

Ink 4: Absorption Peak at 800 nm

| | |
|---|---|
| Absorber dye IR P303 (Honeywell) | 1.0% |
| Ethyl acetate | 2.2% |

The resins were dispersed with the solvents during 15 minutes using a laboratory dispersing equipment. The dyes were added subsequently and the formulation was further dispersed during 15 minutes. The viscosity of the resulting formulation was adjusted with a blend of ethyl acetate/ethanol 1:1 to reach the required printing viscosity (15-25" cup DIN4, depending on the application).

To illustrate the reflection characteristics which are obtainable using the ink sets according to the given formulation embodiments, four printed samples were prepared:

EXAMPLE 1

Figure 3:
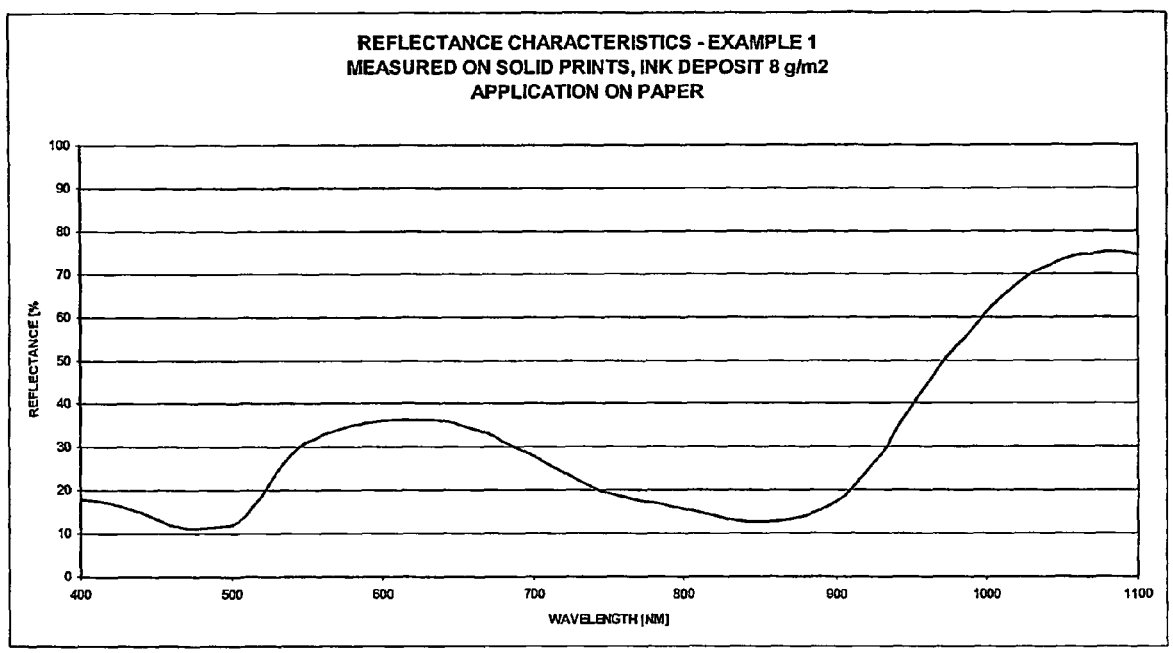
FIG. 3 shows the spectral reflectance characteristics of a feature printed with the ink of example 1

Intaglio ink, obtained by mixing Ink 1 and Ink 2 of formulation 1 (above) in a ratio 1:1 and printing on paper at 8 g/m². The reflectance spectrum is given in FIG. 3.

EXAMPLE 2

Figure 4:
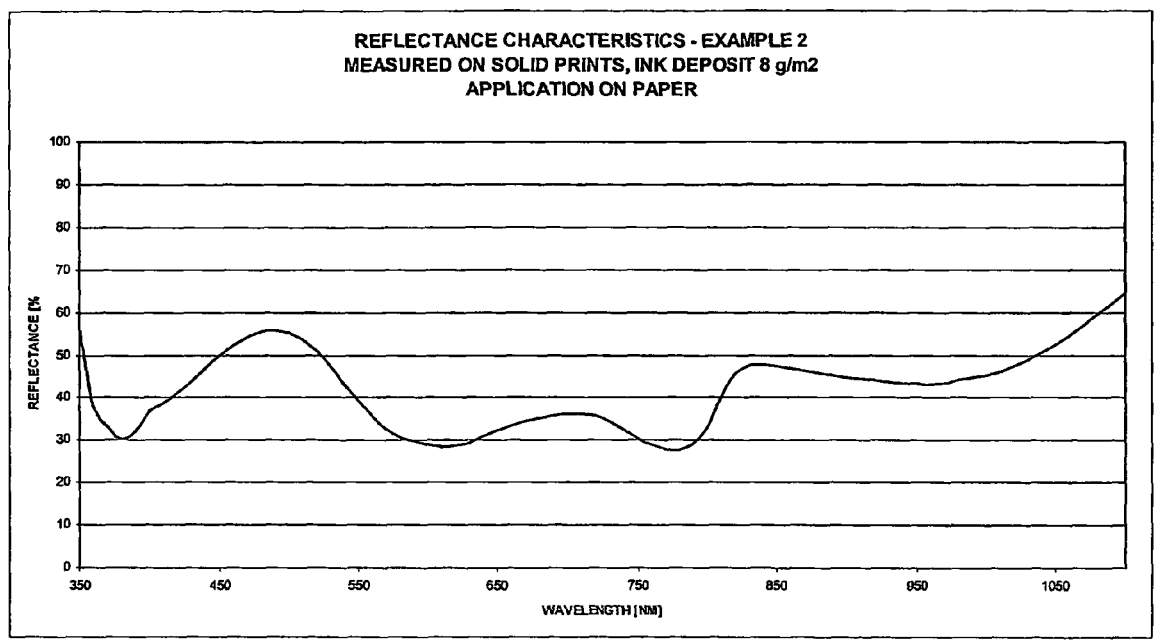
FIG. 4 shows the spectral reflectance characteristics of a feature printed with the ink of example 2

Intaglio ink, obtained by mixing Ink 3, Ink 4 and Ink 5 of formulation 1 (above) in a ratio 1:1:1 and printing on paper at 8 g/m². The reflectance spectrum is given in FIG. 4.

EXAMPLE 3

Figure 5:
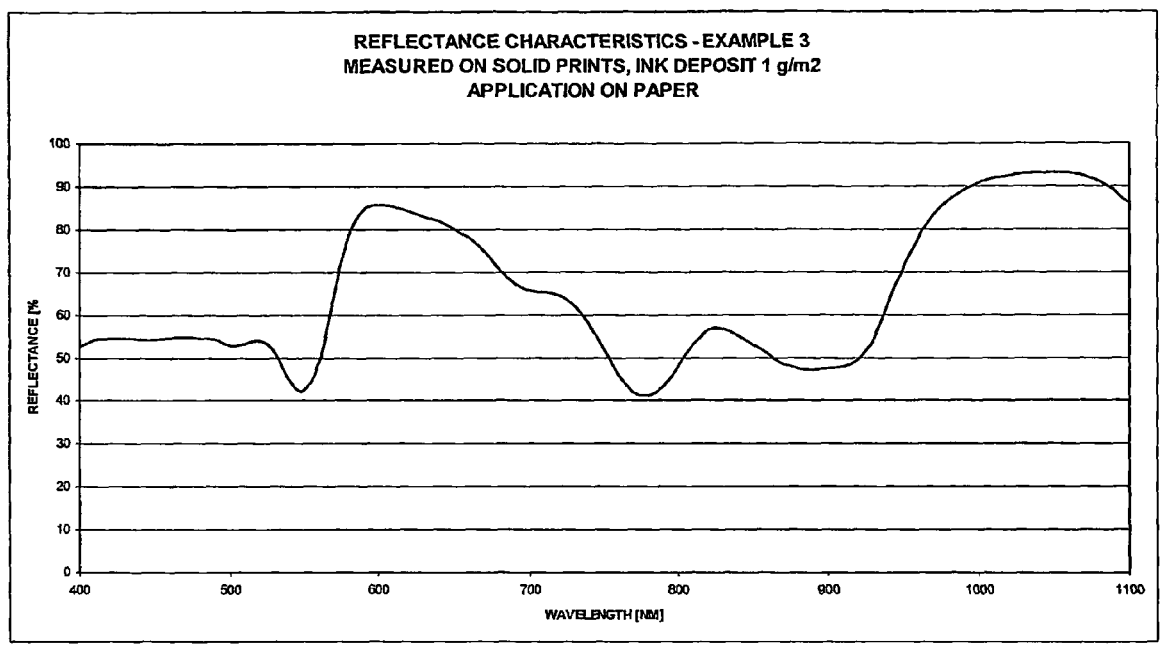
FIG. 5 shows the spectral reflectance characteristics of a feature printed with the ink of example 3

Dry-offset UV-ink, obtained by mixing Ink 1, Ink 2 and Ink 3 of formulation 2 (above) in a ratio 1:1:1 and printing on paper at 1 g/m². The reflectance spectrum is given in FIG. 5.

EXAMPLE 4

Figure 6:
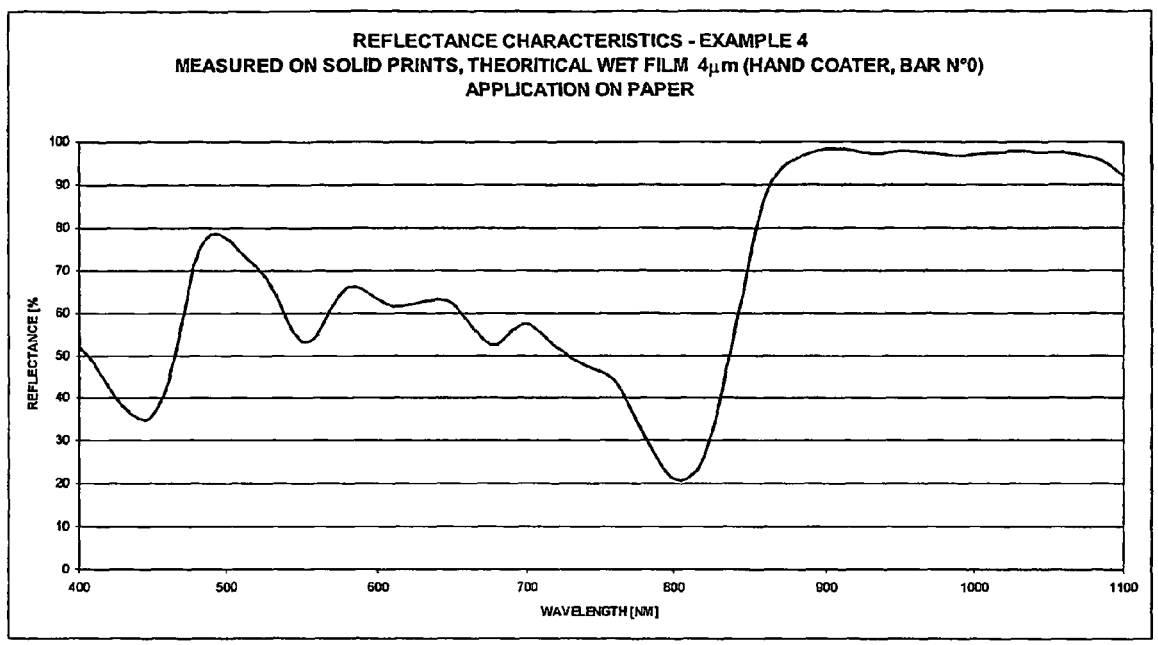
FIG. 6 shows the spectral reflectance characteristics of a feature printed with the ink of example 4.

Gravure ink, obtained by mixing Ink 1, Ink 2, Ink 3 and Ink 4 of formulation 3 (above) in a ratio 1:1:1:1 and applying on paper with a hand coater at 4 μm (theoretical wet film). The reflectance spectrum is given in FIG. 6.

The method of deriving 'hyper-color coordinates' is now further illustrated with the help of a schematic worked example which is shown in Table 1 below. A reader device has 12 spectral channels centered at 400, 450, 500, 550, 600, 650, 700, 750, 800, 850, 900, and 950 nm wavelength, respectively. A different number of channels, at different values of wavelength, may be chosen as well. The channels need not even to be regularly spaced, and a 'channel' might comprise more than one 'wavelengths' or 'spectral bands'.

A hyperchromic color space comprising 6 base colors, is embodied by dyes or pigments having 6 substantially different absorption spectra. These dyes or pigments yield the 'optical density' responses 'Spec 1', 'Spec 2', 'Spec 3', 'Spec 4', 'Spec 5', and 'Spec 6', respectively, with the said reader device; the ensemble of these values constitute the matrix A defining the mathematical basis of the hyperchromic color space.

A measured unknown spectrum, 'Spec y', can be expressed in terms of hyper-color coordinates x of the hyperchromic color space by taking the product $x=(A'^*A)^{-1}*A'^*y$. In the worked example, the resulting color coordinates (CCRD) of y in terms of the 6 base colors are: 0.35, 0.10, 0.00, 0.40, 0.00, 0.15. This is exactly the linear combination which was used to construct y in this schematic worked example.

This example further illustrates the different matrices of the algorithm, in particular the matrix $M=(A'^*A)^{-1}*A'$, which is used to transform a measured spectrum y into color coordinates x according to the formula $x=M*y$. For a given base color system and a given type of reader device, the matrix M must be calculated only once, and can then be stored in the reader device, as a part of the authentication algorithm. It can be interpreted as a sort of key which enables to extract the relevant color-coordinates out of a more abundant spectral information.

In a schematic worked example of authentication, and with reference to Table 2 below, a hypercolor system is assumed to be spanned out by 6 dyes or pigments having the spectra (Spec1, ... Spec 6) forming matrix A. The reflection intensity is assumed to be measured for 12 illumination bands, centered at the wavelengths 400, 450, 500, 550, 600, 650, 700, 750, 800, 850, 900, and 950 nm.

A first 'measured' vector 'Spec y1' is constructed by assuming the 'concentration ratios' of 0.35, 0.10, 0.00, 0.40, 0.00, 0.15 for the 6 base colors and calculating the corresponding theoretical reflection optical density values for the 12 illumination bands. After transformation of the vector 'Spec y1' to hypercolor-coordinates, CCRD1, the input concentration ratios are nicely reproduced, with a residual value R of 0.000045, i.e. close to zero.

To simulate a practical application, the vector 'Spec y1' is now perturbed by adding to it a random signal of moderate amplitude, resulting in a 'measured' vector 'Spec y2'. After its transformation to hypercolor-coordinates, CCRD2, the values deviate moderately from the original ones, but still reproduce them in the big lines. The residual value R of 0.015 is quite acceptable, telling that the specimen having the reflection spectrum 'Spec y2' still lies within the defined, hyperchromic color space of the application and can therefore be accepted as authentic, however somewhat soiled.

To simulate a counterfeit, the vector 'Spec y1' is substantially modified at one single point (700 nm; highlighted figure), to yield a 'measured' vector 'Spec y3'. The derived hypercolor-coordinates, CCRD3, still reproduce astonishingly well the original ones; however, the high residual value R of 0.212 is clearly indicating that the specimen having 'Spec y3' is lying outside the defined, hyperchromic color space of the application, and must therefore be rejected as being a counterfeit!

Concluding, the document under test would be rejected if the transformation of its measured reflection optical density spectrum to hypercolor coordinates of the corresponding hyperchromic system yields a residual value R above 0.10, or if one of the obtained hypercolor coordinates lies outside of its initial 'should be'-value, i.e. outside a corresponding, predefined concentration fork. The step of deriving and comparing hyper-color coordinates and R-values, rather than crude spectral absorbance, reflectance or transmittance values, brings in the advantage of robustness and the feasibility of an almost 100% false rejection, all realizable with low-cost, all-round, non-contact, optical, and high-speed operate-able authentication equipment, combined with customer-specific, material-based security elements printed on the document.

TABLE 1

Schematic worked example of a determination of hyper-color coordinates
Input spectra (A):

|  | Spec 1 | Spec 2 | Spec 3 | Spec 4 | Spec 5 | Spec 6 |
|---|---|---|---|---|---|---|
| 400 nm | 0.200 | 0.000 | 0.000 | 1.200 | 2.000 | 0.050 |
| 450 nm | 1.000 | 0.050 | 0.000 | 1.000 | 1.800 | 0.100 |
| 500 nm | 0.200 | 0.300 | 0.050 | 0.500 | 1.500 | 0.200 |
| 550 nm | 0.050 | 1.200 | 0.200 | 0.200 | 1.000 | 0.500 |
| 600 nm | 0.000 | 0.200 | 0.500 | 0.050 | 0.500 | 0.100 |
| 650 nm | 0.000 | 0.050 | 1.500 | 0.050 | 0.100 | 0.000 |
| 700 nm | 0.000 | 0.000 | 0.500 | 0.200 | 0.000 | 0.000 |
| 750 nm | 0.000 | 0.000 | 0.200 | 1.000 | 0.050 | 0.000 |
| 800 nm | 0.000 | 0.000 | 0.050 | 0.300 | 0.200 | 0.000 |
| 850 nm | 0.000 | 0.000 | 0.000 | 0.050 | 0.900 | 0.050 |
| 900 nm | 0.000 | 0.000 | 0.000 | 0.000 | 0.200 | 0.200 |
| 950 nm | 0.000 | 0.000 | 0.000 | 0.000 | 0.100 | 1.100 |

Measured Spectrum (y):

|  | Spec y |
|---|---|
| 400 nm | 0.560 |
| 450 nm | 0.770 |
| 500 nm | 0.330 |
| 550 nm | 0.300 |
| 600 nm | 0.060 |
| 650 nm | 0.030 |
| 700 nm | 0.080 |
| 750 nm | 0.400 |
| 800 nm | 0.120 |
| 850 nm | 0.030 |
| 900 nm | 0.030 |
| 950 nm | 0.170 |

Matrix $A'^*A$:

|  | 1 | 2 | 3 | 4 | 5 | 6 |
|---|---|---|---|---|---|---|
| 1 | 1.083 | 0.170 | 0.020 | 1.350 | 2.550 | 0.175 |
| 2 | 0.170 | 1.575 | 0.430 | 0.453 | 1.845 | 0.685 |
| 3 | 0.020 | 0.430 | 2.835 | 0.480 | 0.695 | 0.160 |
| 4 | 1.350 | 0.453 | 0.480 | 3.868 | 5.335 | 0.368 |
| 5 | 2.550 | 1.845 | 0.695 | 5.335 | 11.652 | 1.325 |
| 6 | 0.175 | 0.685 | 0.160 | 0.368 | 1.325 | 1.565 |

Matrix $(A'^*A)^{-1}$:

|  | 1 | 2 | 3 | 4 | 5 | 6 |
|---|---|---|---|---|---|---|
| 1 | 2.134 | 0.297 | 0.077 | −0.194 | −0.434 | 0.037 |
| 2 | 0.297 | 1.028 | −0.108 | 0.210 | −0.286 | −0.280 |
| 3 | 0.077 | −0.108 | 0.378 | −0.081 | 0.014 | 0.007 |
| 4 | −0.194 | 0.210 | −0.081 | 0.803 | −0.360 | 0.054 |
| 5 | −0.434 | −0.286 | 0.014 | −0.360 | 0.399 | −0.081 |
| 6 | 0.037 | −0.280 | 0.007 | 0.054 | −0.081 | 0.813 |

Vector A'*y:

| 1 | 2 | 3 | 4 | 5 | 6 |
|---|---|---|---|---|---|
| 0.963 | 0.511 | 0.278 | 2.125 | 3.428 | 0.521 |

Vector x=(A'*A)$^{-1}$*A'*y:

|  | 1 | 2 | 3 | 4 | 5 | 6 |
|---|---|---|---|---|---|---|
| CCRD | 0.347 | 0.103 | 0.003 | 0.399 | 0.001 | 0.154 |

Matrix (A'*A)$^{-1}$*A:

|  | S1 | S2 | S3 | S4 | S5 | S6 |
|---|---|---|---|---|---|---|
| 400 nm | −0.672 | −0.274 | −0.054 | 0.208 | 0.276 | −0.050 |
| 450 nm | 1.177 | 0.016 | 0.016 | −0.023 | −0.098 | 0.012 |
| 500 nm | −0.221 | −0.017 | −0.016 | −0.107 | 0.231 | −0.009 |
| 550 nm | 0.024 | 0.844 | −0.049 | 0.054 | −0.075 | 0.004 |
| 600 nm | −0.125 | −0.009 | 0.171 | −0.133 | 0.123 | −0.009 |
| 650 nm | 0.077 | −0.128 | 0.560 | −0.107 | 0.029 | −0.009 |
| 700 nm | −0.000 | −0.012 | 0.173 | 0.120 | −0.065 | 0.014 |
| 750 nm | −0.201 | 0.175 | −0.005 | 0.769 | −0.337 | 0.051 |
| 800 nm | −0.141 | 0.001 | −0.003 | 0.165 | −0.027 | 0.000 |
| 850 nm | −0.398 | −0.261 | 0.009 | −0.281 | 0.337 | −0.030 |
| 900 nm | −0.079 | −0.113 | 0.004 | −0.061 | 0.064 | 0.146 |
| 950 nm | −0.003 | −0.336 | 0.009 | 0.023 | −0.049 | 0.886 |

TABLE 2

Schematic worked example of authentication

|  | 400 nm | 450 nm | 500 nm | 550 nm | 600 nm | 650 nm | 700 nm | 750 nm | 800 nm | 850 nm | 900 nm | 950 nm |
|---|---|---|---|---|---|---|---|---|---|---|---|---|
| Input spectra of dyes or pigments (A'): | | | | | | | | | | | | |
| Spec 1 | 0.200 | 1.000 | 0.200 | 0.050 | 0.000 | 0.000 | 0.000 | 0.000 | 0.000 | 0.000 | 0.000 | 0.000 |
| Spec 2 | 0.000 | 0.050 | 0.300 | 1.200 | 0.200 | 0.050 | 0.000 | 0.000 | 0.000 | 0.000 | 0.000 | 0.000 |
| Spec 3 | 0.000 | 0.000 | 0.050 | 0.200 | 0.500 | 1.500 | 0.500 | 0.200 | 0.050 | 0.000 | 0.000 | 0.000 |
| Spec 4 | 1.200 | 1.000 | 0.500 | 0.200 | 0.050 | 0.050 | 0.200 | 1.000 | 0.300 | 0.050 | 0.000 | 0.000 |
| Spec 5 | 2.000 | 1.800 | 1.500 | 1.000 | 0.500 | 0.100 | 0.000 | 0.050 | 0.200 | 0.900 | 0.200 | 0.100 |
| Spec 6 | 0.050 | 0.100 | 0.200 | 0.500 | 0.100 | 0.000 | 0.000 | 0.000 | 0.000 | 0.050 | 0.200 | 1.100 |
| Measured spectra (y'): | | | | | | | | | | | | |
| Spec y1 | 0.560 | 0.770 | 0.330 | 0.300 | 0.060 | 0.030 | 0.080 | 0.400 | 0.120 | 0.030 | 0.030 | 0.170 |
| Spec y2 | 0.500 | 0.800 | 0.300 | 0.350 | 0.100 | 0.050 | 0.100 | 0.350 | 0.100 | 0.050 | 0.100 | 0.200 |
| Spec y3 | 0.560 | 0.770 | 0.330 | 0.300 | 0.060 | 0.030 | 0.400 | 0.400 | 0.120 | 0.030 | 0.030 | 0.170 |

Resulting color coordinates (x') and residuals (R):

|  | 1 | 2 | 3 | 4 | 5 | 6 | Residual |
|---|---|---|---|---|---|---|---|
| CCRD1 | 0.347 | 0.103 | 0.003 | 0.399 | 0.001 | 0.154 | R = 0.000045 |
| CCRD2 | 0.426 | 0.127 | 0.028 | 0.336 | 0.003 | 0.191 | R = 0.015184 |
| CCRD3 | 0.347 | 0.099 | 0.059 | 0.438 | −0.019 | 0.159 | R = 0.212350 |

The invention claimed is:

1. A printing ink, comprising
   a) at least one dye or pigment having at least one absorption maximum in the visible range of the electromagnetic spectrum which is substantially different from the absorption maxima of the base colors of the CIEXYZ system, and
   b) at least one other dye or pigment having an absorption band in the visible range of the electromagnetic spectrum whose band width at half intensity is narrower than 2400 cm$^{-1}$, and
   c) at least one other dye or pigment having at least one absorption maximum in the ultraviolet or in the infrared region.

2. A printing ink according to claim 1, wherein the band width at half intensity of said dye or pigment b) is narrower than 2000 cm$^{-1}$.

3. A printing ink according to claim 1, wherein the band width at half intensity of said dye or pigment b) is narrower than 1500 cm$^{-1}$.

4. A printing ink according to claim 1, wherein said at least one other dye or pigment c) has at least one absorption maximum in the near-infrared region of the electromagnetic spectrum.

5. A printing ink according to claim 1, comprising at least three different dyes or pigments having absorption spectra which are substantially different from each other.

6. A printing ink according to claim 1, comprising at least four different dyes or pigments having absorption spectra which are substantially different from each other.

7. A printing ink according to claim 1, comprising at least two different dyes or pigments having at least one absorption maximum in the infrared range.

8. A printing ink according to claim 1, comprising at least three different dyes or pigments having at least one absorption maximum in the infrared range.

9. A printing ink according to claim 8, wherein said at least three different dyes or pigments have at least one absorption maximum in the near-infrared range of the electromagnetic spectrum.

10. A printing ink according to claim 1, comprising at least four different dyes or pigments having at least one absorption maximum in the visible range of the electromagnetic spectrum.

11. A printing ink according to claim 1, further comprising a reflecting pigment.

12. A set of printing inks, comprising at least two printing inks according to claim 1.

13. A set of printing inks according to claim 12, comprising at least three of said different printing inks each having a dye or pigment which is different from the dyes or pigments in the other printing inks.

14. A set of printing inks according to claim 12, wherein the different dyes or pigments have at least one absorption maximum in the visible range of the electromagnetic spectrum.

15. A set of printing inks according to claim 12, wherein at least one printing ink comprises a dye or pigment having at least one absorption maximum in the ultraviolet or in the infrared region.

16. A set of printing inks according to claim 15, wherein said dye or pigment has at least one absorption maximum in the near-infrared region of the electromagnetic spectrum.

17. A set of printing inks according to claim 12, wherein at least one printing ink comprises a reflecting pigment.

18. A method for marking an article, comprising the step of providing on said article a marking which is applied by using at least one member of the group consisting of i) a printing ink according to claim 1,
ii) a set of printing inks each being an ink as recited in i),
iii) a coating composition comprising at least one printing ink recited in i), and
iv) a coating composition comprising a set of printing inks as recited in ii).

19. A method according to claim 18, wherein said article is selected from the group consisting of a banknote, a document, a ticket, a foil, a thread, a label, a card, and a commercial good.

20. A marking comprising at least one printing ink according to claim 1.

21. A marking comprising at least one set of printing inks according to claim 10.

22. An article comprising at least one marking according to claim 20.

23. An article according to claim 22, wherein said article is selected from the group consisting of a banknote, a document, a ticket, a foil, a thread, a label, a card, and a commercial good.

* * * * *